April 18, 1939. W. C. BARNETT 2,155,294
FISHING LURE
Filed April 28, 1937
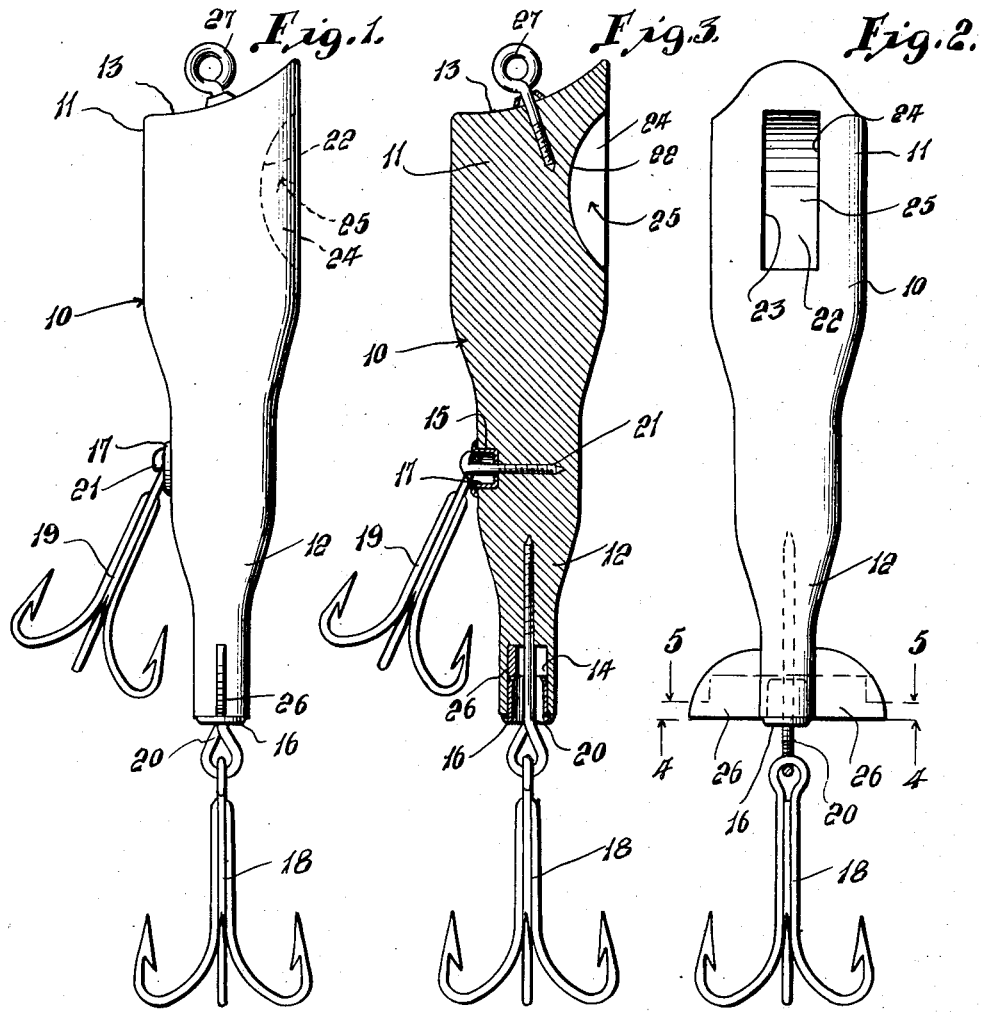
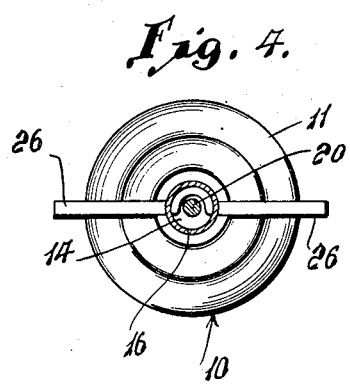
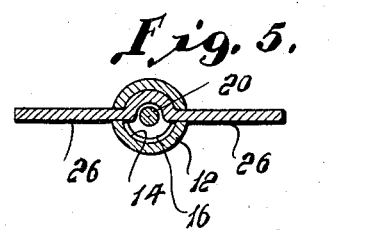
Inventor
William C. Barnett Patented Apr. 18, 1939

2,155,294

UNITED STATES PATENT OFFICE 2,155,294

FISHING LURE

William C. Barnett, Detroit, Mich.

Application April 28, 1937, Serial No. 139,609

7 Claims. (Cl. 43—46)

This invention relates to improvements in fishing lures.

The object of the invention is to provide a buoyant lure having a recess therein that will function as a vacuum cup to create a "popping" sound in the water to attract fish.

Another object of the invention is to shape the body so that it will rest vertically in the water with the head only exposed so that the recess will function when the lure is jerked to a horizontal position.

Other objects and advantages of the invention will become apparent from the specification of which the drawing forms a part, and wherein:

Figure 1 is a side elevational view of the lure,

Figure 2 is a sectional view in elevation of the same,

Figure 3 is a top plan view of the lure,

Figure 4 is a cross sectional view on the line 4—4 of Figure 3, and

Figure 5 is a cross sectional view on the line 5—5 of Figure 3.

Referring more particularly to the drawing wherein like reference characters designate like or corresponding parts in the different views, the body 10 is formed of a buoyant material and is tapered from the head 11 to the tail 12. The head 11 is provided with an end 13 which is concave from top to bottom and slightly convex from side to side. This shape will tend to cause the lure to follow a straight course when being drawn through the water.

The tail 12 is provided with recesses 14 and 15 in the end and underside thereof respectively to receive the cylindrical or cup like members 16 and 17 which protect the body 10 from the hooks 18 and 19 which are secured thereto by the fastening members 20 and 21 respectively.

The top of the head portion 11 is provided with a longitudinal arcuate recess 22 having vertical side walls 23 and 24 to form a vacuum cup 25.

The tail 12 is provided with a fin 26 which extends horizontally therethrough and which is intended to function as a stabilizer. Fin 26 also acts to resist the water when a sudden jerk is imparted to body 10 so that the tail 12 will not kick up out of the water. Fin 26 also functions at all times to prevent the body 10 from turning over.

The end 13 is provided with an eye screw 27 to which is attached a fishing line (not shown).

In operation the lure 10 will assume a vertical position in the water with the end 13 extending above the surface, the lure 10 being held normally in this position by the weight of hooks 18 and 19. A sudden jerk on a line connected to member 27 will cause lure 10 to assume a horizontal position on the surface, the fin 26 tending to prevent the lure 10 from turning over during this movement. As lure 10 reaches a horizontal position the water will rush in over sides 23 and 24 to fill space 25 causing a "popping" sound which will attract fish to the lure 10. The shape of end 13 and fin 26 will combine to cause lure 10 to follow a straight course when being drawn through the water.

It is to be understood that only the preferred embodiment of the invention has been shown, the right being reserved to make such changes and modifications as do not depart from the spirit and scope of the invention.

I claim as my invention:

1. A device of the class described comprising a tapered buoyant body portion, and hooks secured to the body and acting to hold the device normally in a vertical position, and the head portion of said body being provided with an arcuate recess forming a vacuum cup.

2. A floating lure comprising a tapered body having hooks secured thereto and causing the lure to assume a vertical position, the upper side of said body portion being provided with a recess forming a vacuum cup, and a stabilizing fin secured to the tail of said lure.

3. A fish lure comprising a buoyant body having a recess formed in the head thereof and provided with vertical side walls, hooks secured to said body and acting to normally hold it in a vertical position in the water, and a fin secured to the tail of said body to resist the water when the lure is pulled to a horizontal position, said recess forming a vacuum cup to cause a "popping" sound as the lure moves to a horizontal position and the water rushes in over the side walls.

4. In a device of the class described, a tapered buoyant body having a recess formed in the back of the head thereof, and means connected to the opposite end of said body to normally hold it in a vertical position in the water, said recess forming a vacuum cup to cause a "popping" sound as the body is pulled to a horizontal position by the water rushing therein as the head is submerged.

5. A fish lure comprising a buoyant tapered body having an arcually shaped longitudinally disposed recess in the back of its head, weighted means secured to the opposite end of said body to normally retain it in a vertical position in the water, and means in said head adapted to be connected to a line pulling the body to a horizontal position to cause the water to rush into the said recess from opposite sides.

6. In a fish lure, a buoyant body having a recess in the back part of its head forming a vacuum cup, and means connected to the opposite end of said body to retain it in a vertical position in the water, said means including a stabilizing fin for controlling the movement of the body when it is pulled to a horizontal position to cause the water to rush into said recess from its opposite sides to create a "popping" sound.

7. In a fish lure, a buoyant body having a recess in the back of its head, a hook secured to its under side, and a hook secured to its tail, said hooks normally retaining the body in a vertical position, said first mentioned hook retaining the body in an upright position with the recess on its top side when the body is jerked to a horizontal position in the water whereby said recess will act as a vacuum cup to create a "popping" sound.

WILLIAM C. BARNETT.